United States Patent [19]

Oswald

[11] 4,200,827
[45] Apr. 29, 1980

[54] POSITIONING SYSTEM EMPLOYING FEEDFORWARD AND FEEDBACK CONTROL

[75] Inventor: Richard K. Oswald, San Jose, Calif.

[73] Assignee: International Business Machines Corporation, Armonk, N.Y.

[21] Appl. No.: 811,350

[22] Filed: Jun. 29, 1977

[51] Int. Cl.² ............................................ G05B 13/00
[52] U.S. Cl. ................................. 318/561; 318/594; 318/616
[58] Field of Search ............... 318/561, 592, 594, 616, 318/621; 364/105; 360/78

[56] References Cited

U.S. PATENT DOCUMENTS

| | | | |
|---|---|---|---|
| 3,657,524 | 4/1972 | Bakke | 318/561 |
| 3,699,555 | 10/1972 | Duvall | 318/561 UX |
| 3,721,882 | 3/1973 | Helms | 318/594 |
| 3,749,997 | 7/1973 | Cohen et al. | 318/592 |
| 3,839,664 | 10/1974 | Dirks et al. | 318/594 |
| 4,006,394 | 2/1977 | Cuda et al. | 318/594 |

OTHER PUBLICATIONS

Oswald, R. K., "Design of a Disk File Head Positioning Servo," *IBM J. Res. & Development*, Nov. 1974, pp. 506-512.

*Primary Examiner*—Gene Z. Rubinson
*Assistant Examiner*—Eugene S. Indyk
*Attorney, Agent, or Firm*—Richard E. Cummins; Robert D. Moss

[57] ABSTRACT

A positioning system for moving a member between positions in time optimal fashion employs concurrent "feedforward" and "feedback" control. The feedforward control system provides major control and the feedback control system provides minor control to correct for deviations between the actual and a nominal system. The feedback loop may thus be of low bandwidth permitting desensitization to high frequency disturbances or the employment of inherently low bandwidth controlled variables.

The "feedforward" control function includes successive portions of opposite polarity corresponding to acceleration and deceleration of the member and also includes a subtractive velocity related component. This function represents the approximate current input to an electromagnetic coil actuator of a nominal system required to move such a member between positions in time optimal fashion.

13 Claims, 7 Drawing Figures

POSITIONING SYSTEM EMPLOYING FEEDFORWARD AND FEEDBACK CONTROL

BACKGROUND OF THE INVENTION

1. Field of the Invention
1. Field of the Invention

The present invention relates to positioning systems for moving a member between positions in a minimum time in response to a position input command.

2. Description of the Prior Art

A typical positioning application to which the present invention relates is the positioning of a data recording head or heads over a selected track of a magnetic disk file. The aspect of this positioning operation which is of interest is the movement of heads between tracks, known as the "track access" or "seek" operation, as opposed to the "track follow" operation which maintains the heads in position over a selected track.

Time optimal motion between tracks implies maximum acceleration and deceleration of the heads within the physical constraints of the system. To control such motion and bring the heads accurately to rest on the target track, feedback control of head velocity is normally employed. Velocity control offers a higher performance than position control because velocity is the time derivative of position. A typical system for controlling a disk file head access operation is described in an article entitled "Design of a Disk File Head-Positioning Servo" by R. K. Oswald (IBM Journal of Research and Development, Nov. 1974, pp. 506–512).

In the system described in that article and in similar systems employed in many commercially available disk files, an access operation is controlled by means of a generated reference velocity trajectory representing the required velocity of the heads for deceleration at the maximum attainable rate to a state of rest over the target track. A velocity transducer (or tachometer) measures the actual velocity of the heads and the measured velocity is compared with the reference velocity trajectory and amplified in an error amplifier to provide a velocity error signal. The velocity error signal is applied to control the head actuator, typically a voice coil motor, to cause the actual velocity to follow the deceleration curve as closely as possible. Initially, actual velocity is low and the heads are accelerated under open loop (saturated) conditions until the actual velocity equals the reference velocity. When actual velocity exceeds the reference velocity, the sign of the velocity error changes and reverse current is applied to the actuator. The reverse current is controlled as a function of the velocity error to cause the head velocity to follow the reference velocity trajectory accurately. Considerable accuracy is possible since, generally, a high bandwidth velocity measurement is available with very little lag. Typically, a velocity signal is derived from incremental position signals provided by an external position transducer linked to the head motion or, by a servo head and dedicated servo surface on one of the disks.

However, the velocity feedback loop is Type 1 and the reference velocity trajectory is approximately a ramp so that the velocity error can never be completely eliminated. The magnitude of the velocity error is dependent on the overall gain of the feedback loop which also affects the bandwidth. A compromise is necessary between the reduction of velocity error and the limitations on feedback loop gain and bandwidth imposed by the mechanical resonances of the system. If the gain is more than unity at a resonance frequency, the system will be unstable. This problem is becoming increasingly acute with the need to improve access times and with the higher frequencies inherent in increased track density.

In the process control art, control systems are known which employ both feedback and feedforward control. U.S. Pat. Nos. 3,657,524 (Bakke) and 3,758,762 (Littman) describe such systems. In the system described in the Bakke patent, for example, a process is coarsely controlled by means of a manipulated variable to produce a desired change in a measurable controlled variable of the process. A control and feasible response means is responsive to a command signal, defining a set point of the process, to provide a control signal, in accordance with a predetermined model of the process, for controlling the manipulated variable in such a way as to bring the process to the set point. This is "feedforward" control. Simultaneously, the control and feasible response means provides a feasible response signal, representing the predicted response of the controlled variable to the change of the manipulated variable in accordance with the "feedforward" control signal. The feasible response signal is compared with the actual measured response of the controlled variable to provide an error signal. This error signal is summed with the fed forward manipulated variable to provide minor feedback control of the process. The problems of the process control art are somewhat different from those of the position control systems with which the present invention is concerned. In process control there is often a long delay between alteration of the manipulated variable and the process response, which makes feedback control alone impractical. Further, the command signal may change before the previous one has been executed. Thus, although "feedforward" plus feedback control is described for process control applications, there is no suggestion in the cited patents of an application to position control or discussion of the specific features of feedforward plus "feedback" position control to which the present invention relates and which will become apparent below.

To complete the discussion of the prior art, U.S. Pat. No. 3,958,109 to Doherty for a "Universal Modularized Digital Controller" describes a position control system particularly suitable for gun control where command signals are presented in rapid succession. This patent shows a digital system for computing essentially a velocity reference function in response to applied commands and fed back position signals. The computation of the velocity reference involves a component referred to as "additive compensation ("feedforward" velocity)" which is essentially a cumulative function of input commands. This component is used to modify the primary velocity reference signal. It is not employed as a direct input to the power drive for effecting the desired movement, nor does it vary with time in the absence of further commands. The digital velocity reference signal including the additive compensation is converted to an analog function and compared with a fed back velocity measurement to produce a velocity error signal. The velocity error signal alone is applied to control the power drive.

Thus, Doherty shows only feedback control and does not show true "feedforward" control where a predicted function of a manipulated variable (the power drive input) is applied directly to control the power drive so as to produce a desired change in position.

SUMMARY OF THE INVENTION

It is an object of the present invention to provide a positioning system employing both "feedforward" and feedback control for moving a member between reference positions in a minimum time.

It is a further object of the invention to provide a "feedforward" plus feedback position control system suitable for causing an electromagnetic coil actuator to move a member between positions in a minimum time.

It is also an object of the invention to provide an accurate high performance positioning system employing a position feedback loop of limited bandwidth in combination with a "feedforward" control system It is yet another object of the invention to provide an accurate high performance positioning system with increased independence from mechanical resonance limitations.

These and other objects of the invention are achieved in a positioning system for moving a member between a current and a target reference position in time optimal fashion which employs simultaneous "feedforward" and feedback control of an actuator for positioning the member. The "feedforward" signal is the primary or major component of the multi-component current drive signal and represents the current input to the actuator of a nominal system required to move such a member to said target position and bring it to rest thereat in a minimum time consistent with performance restraints on the system.

Such a signal has an initial portion of one polarity for causing maximum acceleration and a final portion of opposite polarity for causing maximum deceleration. An intermediate zero level portion may separate the initial and final portions where the maximum velocity of the member is to be restricted. The invention also provides that a component proportional to velocity be algebraically subtracted from both the initial and final portions of the "feedforward" drive signal to represent the effect of back e.m.f. of an electromagnetic coil type actuator.

The feedback signal is derived by comparing a measured position related quantity of the member with a reference signal representing the required variation of said quantity with time for time optimal motion. This feedback signal provides minor control of the positioning motion and merely has to correct for deviations caused by differences between the nominal and actual systems.

Thus, the feedback control loop can be of relatively low bandwidth since the high rate of change component of the acceleration is controlled by the major component of the drive signal. In a positioning system subject to mechanical resonances and employing a relatively high bandwidth transducer for measuring the position related quantity, the invention permits the feedback loop bandwidth to be greatly reduced thus desensitizing the system to high frequency disturbances without loss of performance.

By permitting the bandwidth of the feedback loop to be lowered, the invention also enables the measured position related quantity to be position rather than velocity. Specifically, the invention provides a "feedforward" position control system combined with a feedback control system using incremental position as the controlled variable.

DESCRIPTION OF THE PREFERRED EMBODIMENT

Figure 1:
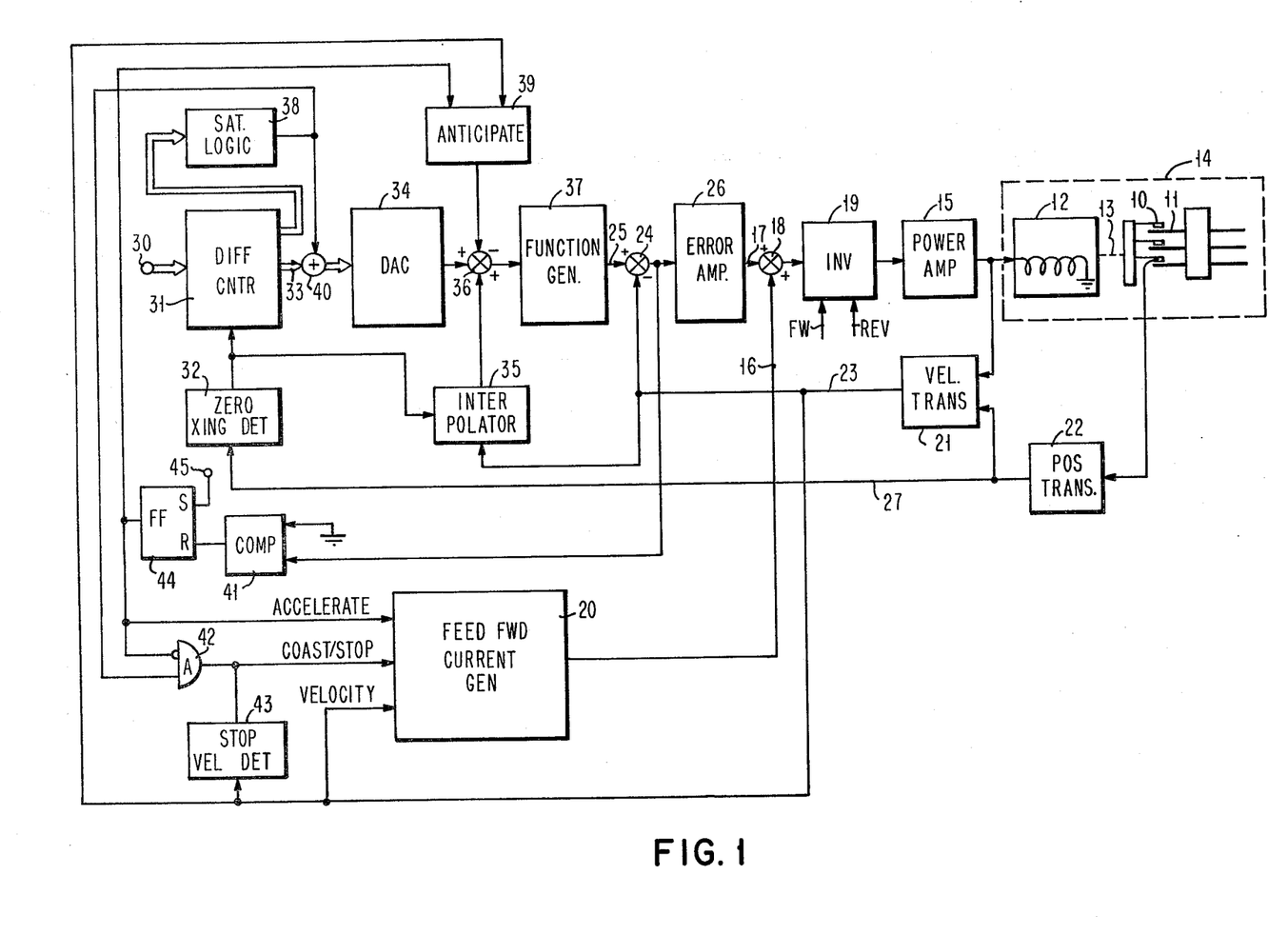
FIG. 1 comprises a diagrammatic illustration of a preferred positioning system according to the present invention.

In FIG. 1, there is shown a preferred positioning system according to the present invention. Specifically, the positioning system controls the positioning of heads 10 relative to information bearing concentric tracks on disks 11 of a schematically illustrated disk file. The heads are moved by an actuator 12 of the well known voice coil motor type. The mechanical connection between the actuator 12 and heads 10 is schematically indicated by dashed line 13 and includes a carriage (not shown) for supporting the heads. The motor 12, the heads 10 and disks 11 together with other support components including the head carriage constitute a mechanical system 14. This system as a whole has natural resonance frequencies typically of the order of a few thousand Hertz which, as will be explained further below, may affect the stability of the positioning system, if they are excited and amplified.

The input circuit of actuator 12 comprises a power amplifier 15 which amplifies an input current drive signal to provide a current to the actuator coil. A first control signal on line 16 and a second control signal on line 17 are summed in summing junction 18 and selectively inverted by inverter 19, depending on the direction of motion, to provide the multi-component current drive signal to the power amplifier 15.

The first control signal is generated by current generator 20, the details of which will be explained below in connection with FIG. 3. Generator 20 is referred to as a current generator as an indication of its overall function as contrasted with the specific component employed to achieve the function. The current trajectory of generator 20 is illustrated as waveform 101 of FIG. 4(a) and represents the actuator current required for a nominal system to cause the actuator to move the heads from one track to another in a minimum time. If the actual system were exactly the same as the nominal system, the heads would be moved to the target track and brought to rest there in a minimum time without further control being necessary. However, since there will be parameter differences between the nominal and actual systems, the actual response of the system is measured and fed back for use in a second or feedback control arrangement to ensure accurate positioning.

As in the system described in the above referenced Oswald article, the quantity which is measured to determine the response of the system is velocity as in the system of FIG. 1. The velocity of the heads 10 moving radially across the disk is determined by a velocity transducer circuitry 21 from the integral of the current in the actuator coil and the derivative of a periodic incremental position signal from position transducer circuitry 22. A suitable current for deriving a velocity signal from these inputs is described in U.S. Pat. No. 3,820,712 (Oswald). The position transducer circuitry 22 comprises demodulating circuitry for deriving a position error signal from servo signals read by one of the heads 10 from a dedicated servo surface of one of the disks 11. The principles of such circuits are well known and are described in the above referenced Oswald article and also in U.S. Pat. No. 3,691,543 (Mueller). The demodulated position error signal is a cyclic triangular waveform whose zero crossings correspond to track centers.

The measured velocity signal on line 23 is applied to a summing junction 24 to which is also applied a reference velocity signal on line 25. The summing junction forms the difference between the reference velocity signal and the measured velocity signal which is amplified and limited in error amplifier 26 to provide the feedback or minor control signal on line 17.

The reference velocity signal is conventionally produced in response to a position command at input 30 which loads a difference counter 31 with a value equal to the number of tracks between the current track position of the heads and the target position to which they are to be moved. As the heads move towards the target position, zero crossings of the position signal from position transducer circuitry 22 are detected by a zero crossing detector 32. The zero crossing detector output is a series of pulses each of which decrements the difference counter 31 every time a track is crossed. The output of the difference counter 31 is applied on a bus 33 to a digital-to-analog converter 34 which converts the decreasing count to an analog staircase function representative of the instantaneous absolute position error between the heads and the target track. An interpolator 35 receives the track crossing pulses from zero crossing detector 32 and the velocity signal on line 23 and provides a "fill-in" signal which is summed in junction 36 to smooth the output of the DAC 34. The fill-in signal comprises a falling ramp with a slope proportional to velocity which is reset on every track crossing pulse. Circuits for generating such signals are well known and comprise, for example, an integration for integrating the velocity input signal, which is reset to a predetermined level by the track crossing pulses. Finally, the smoothed absolute position error signal from junction 36 is applied to a function generator 37 whose output on line 25 is the reference velocity signal as shown in curve 103, FIG. 4(b).

As described in the above referenced Oswald article, the function generator 37 modifies the absolute position error signal in shape according to a predetermined function. A simple function which has been used is a square root function as this represents the variation of velocity with position for a constant maximum deceleration. In practice, the relationship of velocity to position may be a more complex function to allow for the effect of the actuator back e.m.f. and to meet servo system stability criteria. A circuit for generating a second order function having both a squared and linear term is described below in connection with FIG. 2. The reference velocity signal from function generator 37 represents the required velocity of the heads 10 while decelerating towards target position with the maximum deceleration attainable by a worst case system.

Two other features of the reference velocity generation circuitry are saturation logic 38 and anticipate circuitry 39. The saturation logic 38 is responsive to outputs of the difference counter exceeding a predetermined count to provide a saturation signal to the input of DAC 34 by way of summing junction 40. The presence of the saturation signal causes the DAC output to maintain a constant maximum output. The corresponding velocity reference signal output on line 25 is also constant under these conditions. Thus, the velocity of the heads is limited to a predetermined value, known as the maximum velocity, to protect them from damage in the event of a control failure.

The anticipate circuit 39 is effective, while the heads are accelerating, to lower slightly the absolute position error signal from DAC 34 and thus the reference velocity curve by an amount proportional to velocity. The accelerate phase of the motion is indicated by the output of a flip-flop 44 which is set at input 45 at the start of each new seek. The output of flip-flop 44 is reset by ground level comparator 41, indicating the sign of the velocity error signal from junction 24 and the end of the accelerator phase.

The inverted accelerate signal from flip-flop 44 and the saturation signal from logic 38 are applied to an AND gate 42 to produce a maximum velocity signal which indicates the portion of the motion when the heads are to be held at maximum velocity. This signal is used to control current generator 20.

Another control input to the generator 20 is a "stop velocity" indication from threshold detector 43. This indicates that the heads have come substantially to rest and that the seek motion is complete.

Figure 2:
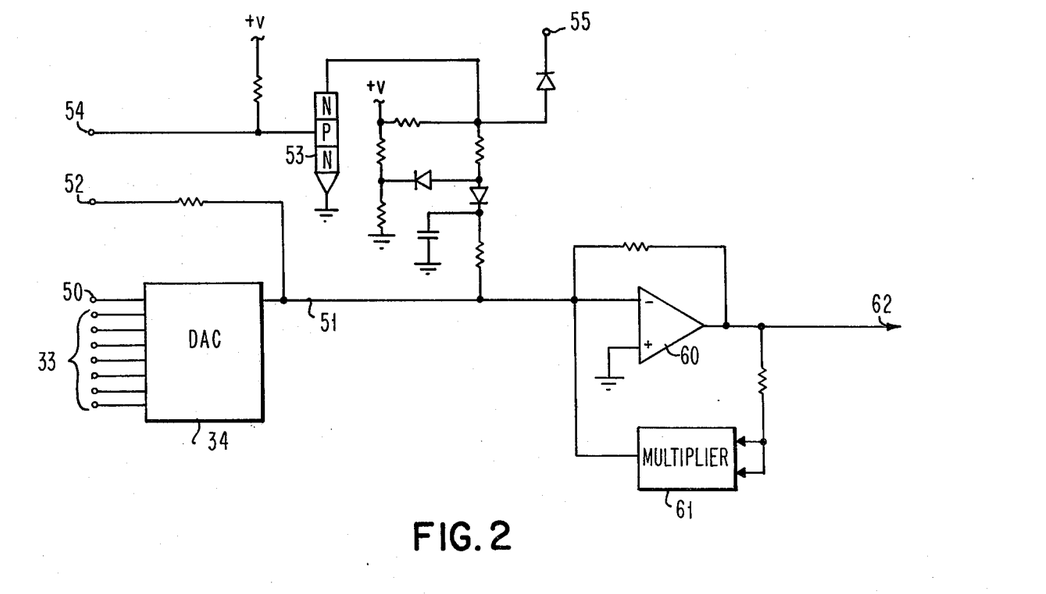
FIG. 2 shows a curve generating circuit suitable for use in the system of FIG. 1.

Part of the reference velocity generating circuitry is shown in greater detail in FIG. 2. The DAC 34 receives the output of difference counter on lines 33 and also the output of saturation logic 38 on additional line 50. The DAC output appears on line 51 and is smoothed by the addition of the fill-in signal from interpolator 35 applied at terminal 52. The anticipate circuitry 39 comprises a switching transistor 53 responsive to an inverted accelerate mode indication at terminal 54 to inhibit the anticipate function. The measured velocity from line 23, FIG. 1, is applied at terminal 55 and, when transistor 53 is off, acts to lower slightly the DAC output level on line 51. By lowering the DAC output and thus the reference velocity curve, as shown by waveform 103 in FIG. 4(b), the sign of the velocity error signal from junction 24, FIG. 1, is caused to change early so as to allow time for the current in the actuator coil to reverse.

The function generator 37 of FIG. 1 is seen in FIG. 2, to comprise an amplifier 60 with a resistive feedback connection to provide a linear term of the required function. A two quadrant transconductance multiplier 61 is connected in feedback configuration around the amplifier 60 to provide the second order term of the function. The output at terminal 62 represents the reference velocity signal on line 25 of FIG. 1.

A preferred implementation of current generator 20 together with other associated portions of the system of FIG. 1 will now be described in greater detail with reference to FIG. 3 and the waveforms of FIG. 4.

Figure 3:
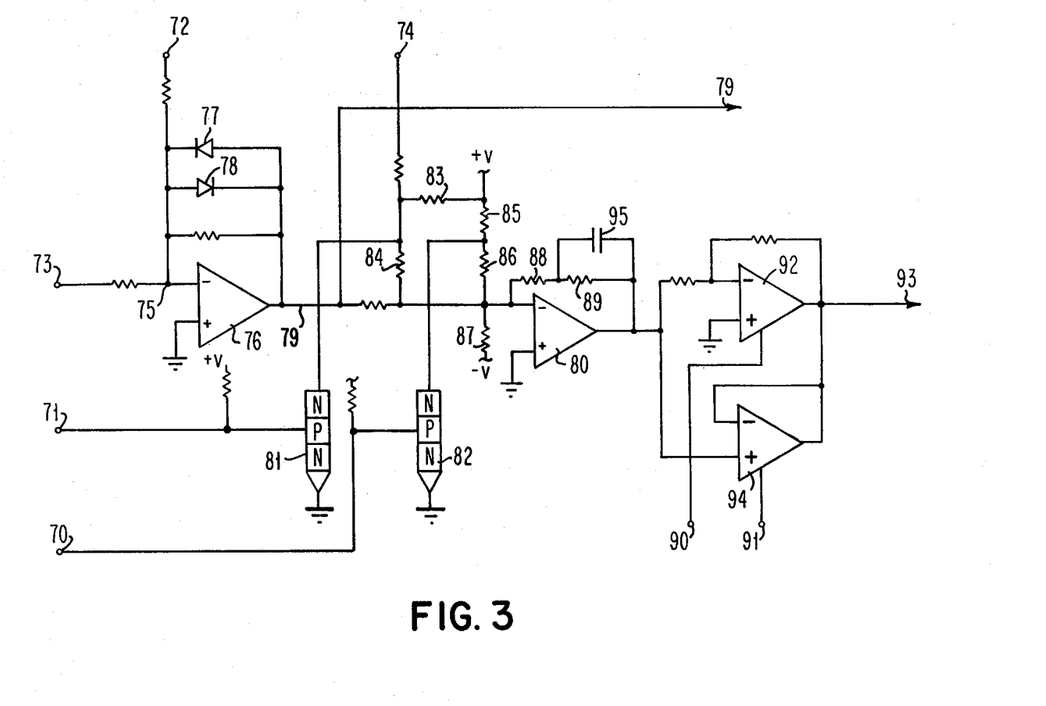
FIG. 3 shows a control signal generating circuit suitable for use in the system of FIG. 1.
Figure 4:
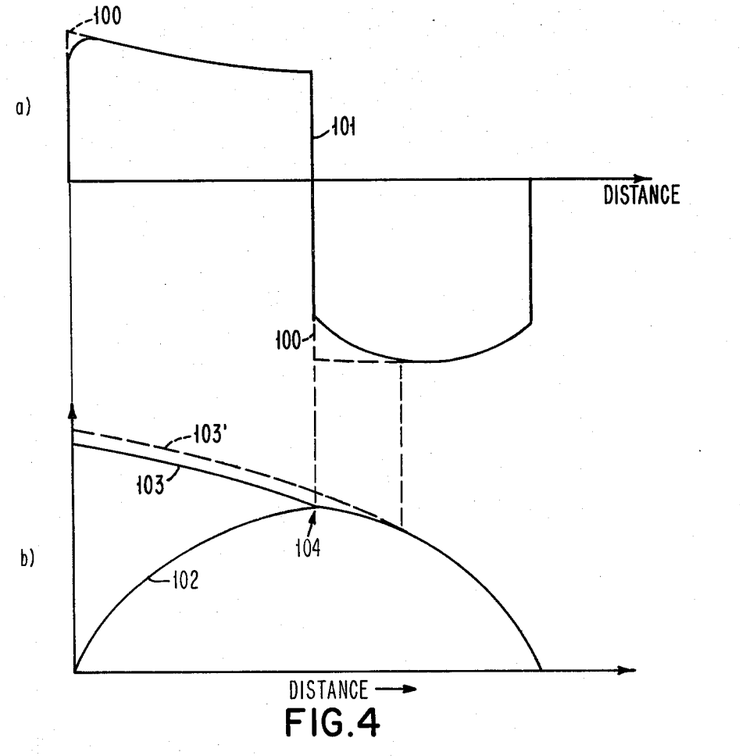
FIG. 4 shows waveforms illustrating the operation of the system and circuits of FIGS. 1 to 3.

The control inputs to the circuit of FIG. 3 comprise the accelerate signal from comparator 41 at terminal 70, the maximum velocity signal from AND gate 42, or the stop velocity signal from detector 43 at terminal 71, the reference velocity signal from function generator 37 at terminal 72, and measured velocity from velocity transducer circuitry 23 at terminals 73 and 74.

In the circuit of FIG. 3, the reference velocity signal at terminal 72 and the measured velocity at terminal 73 are algebraically summed at node 75, corresponding to junction 24 of FIG. 1, to produce the velocity error signal. An operational amplifier 76 amplifies the velocity error. The amplified velocity error is provided at output 79. The amplifier output is limited by diodes 77 and 78 to prevent an excessive output signal during accelerate mode when the velocity error is very large. The limiting function also ensures that the feedback control signal cannot exceed more than a small predetermined fraction (around 15%) of the drive signal.

The generator 20 comprises a resistive network for providing a current input to an operational amplifier 80, the input being switchable under control of transistors 81 and 82. During accelerate mode, transistor 81 is off and transistor 82 is on. A current $I_o$ flows from positive supply through resistor 83. A current $I_v$ proportional to the velocity signal input at terminal 74 is summed with $I_o$ so that a combined current $I_o+I_v$ flows through resistor 84 to the input terminal of amplifier 80. Since transistor 82 is on, current flows from positive supply through resistor 85 to ground and there is no net current through resistor 86. A current of magnitude 2 $I_0$ flows from the input terminal of the amplifier 80 to negative supply through resistor 87. The net input current to the amplifier during accelerate mode is thus $-I_o+I_v$ and results in actuator current shown as the dashed line 100 in the left hand half of FIG. 4(a). As the velocity rises so does $I_v$ and the level of the waveform falls.

In maximum velocity (coast) mode, transistor 81 is on and transistor 82 is off. The combined current which had been flowing through resistor 84 is diverted to ground and equal and opposite currents of 2 $I_o$ flow in resistors 86 and 87. The net input to amplifier 80 is zero and the actuator current is zero. The maximum velocity condition is not illustrated in FIG. 4(a) but would merely comprise a zero level portion separating the positive and negative current pulses.

In decelerate mode, which is indicated by the absence of both coast and accelerate signals, both transistors 81 and 82 are off. The equal and opposite currents 2 $I_o$ in resistors 86 and 87 cancel out leaving a net current of $+I_o+I_v$ through resistor 84. The theoretical shape of the actuator current waveform in this mode is shown by the dashed line 100 in the right hand half of FIG. 4(a). The waveform is reduced to zero when the heads 39 come to rest at the end of a seek by a control input to terminal 71 that is provided by the stop velocity detector 43 of FIG. 1. Since the input terminal is shared with the coast indication, the switch states of the circuit of FIG. 3 are exactly the same as described above in connection with coast mode.

The velocity factor is introduced to represent the effect of back e.m.f. on current in a high performance electromagnetic coil actuator. The back e.m.f. reduces the voltage applied across the coil in the accelerate mode and is added to the voltage applied across the coil in the decelerate mode.

The amplifier 80 is connected in lag-lead filter configuration with a feedback loop comprising resistors 88 and 89 and capacitor 95. The filter modifies the dashed waveform of FIG. 4(a) to the shape of continuous line 101. The filtering action represents the effect of motor coil inductance on the transient response of coil current.

It will be noted that the feedback control voltage from amplifier 76 is effectively summed with the feedforward function at the input to the "feedforward" current generator rather than at the output as suggested by summing junction 18 of FIG. 1. This difference has no practical effect. The output waveform 101 as drawn in FIG. 4(a) is that which would be produced in the absence of a feedback control signal.

A final element of the circuitry of FIG. 3 is selective inversion circuitry responsive to input commands indicating forward or reverse direction at terminals 90 and 91. Amplifier 94 passes the drive signal to output 93 without inversion if line 91, indicating the forward direction of motion is active. Amplifier 94 inverts the drive signal at output 93 if line 90, indicating the reverse direction of motion, is active. This circuitry corresponds to the selective inversion circuit 19 of FIG. 1.

Having described in detail the structure of the positioning systems of FIGS. 1, 2 and 3, some additional description of their operation will be given with reference to FIG. 4.

The current waveform 101 of FIG. 4(a) represents a prediction of the actual current which would exist in the coil of an electromagnetic actuator of a nominal system with full forward then full reverse power applied, less a small margin for control. This waveform is fed forward to the power amplifier of the real system and applied as the major component of actuator input current. The velocity of the heads is thus caused to follow the trajectory 102 in FIG. 4(b). At the same time, the reference velocity signal 103 is generated, as described in connection with FIGS. 1 and 2, which represents the variation of velocity with distance necessary to bring the heads to rest on the target track in the minimum time, i.e., with a worst case system operating at full reverse power. The reference velocity signal is lowered during acceleration from the dashed curve 103' by the action of the anticipate function.

The reference curve 103 is compared with the actual velocity 102 to provide a feedback control to provide a minor component of the drive signal or a correction to the major control action. During acceleration, a feedback control signal is produced, but, because of the large velocity error between curves 102 and 103, is always of the maximum amplitude determined by the limiting diodes of the error amplifier. Thus, the maximum amplitude error signal is simply added as a small increment to the positive portions of the major component and full forward power is applied to the actuator in open loop fashion.

When the actual velocity 102 first exceeds the reference velocity at point 104, the acceleration is terminated. The change in sign of velocity error causes the polarity of the major waveform to start to reverse and after a short internal substantially full reverse current is applied to the coil. If the actual velocity 102 now differs from the reference velocity by a small error within the linear range of the error amplifier, a minor correction component is generated and added to the major component and is effective to maintain the velocity error between curves 102 and 103 to a minimum amount determined by the gain of the feedback loop.

In prior art systems employing only feedback control, the gain and limits of the feedback loop had to be large since the feedback control was required to provide the entire actuator drive signal. A large gain was achieved by means of the error amplifier but at the expense of increased bandwidth. Problems arose when the gain of the system at mechanical resonance frequencies approached unity. At this gain the system would become unstable. Prior systems therefore always had a minimum amount of velocity error which was determined by the mechanical resonance frequencies of their mechanical components. Various filtering techniques have been proposed but all have a deleterious effect on the performance of the system.

With the addition of what is termed "feedforward" control by current generator 20, according to the present invention, the velocity error would disappear entirely, in theory, if the "feedforward" function were 100% accurate. However, more realistically, if a "feedforward" function such as waveform 101 is 90% accurate, then the corrective action required from the feedback control loop is only 10% of what would be required without the "feedforward" function. Thus, the gain of the error amplifier and, roughly speaking, the bandwidth of the feedback loop can be reduced by a factor of ten while maintaining the velocity error between curves 102 and 103 as small as before. This considerably reduces the limitations on performance imposed by the mechanical resonance frequencies of the system. If mechanical resonances are not a problem, then the gain can be maintained high and the velocity error very much reduced over what was possible with feedback control alone.

Thus, in the system of FIGS. 1, 2 and 3, the gain of the error amplifier is set sufficiently low to reduce the bandwidth of the feedback loop to a few hundred Hertz, well below the lowest resonance frequency of a few thousand Hertz. The lag-lead filter formed by resistors 88 and 89 and capacitor 95 in FIG. 3 does reduce the bandwidth somewhat, but the effect is insignificant compared with that of the gain of amplifier 76.

Figure 5:
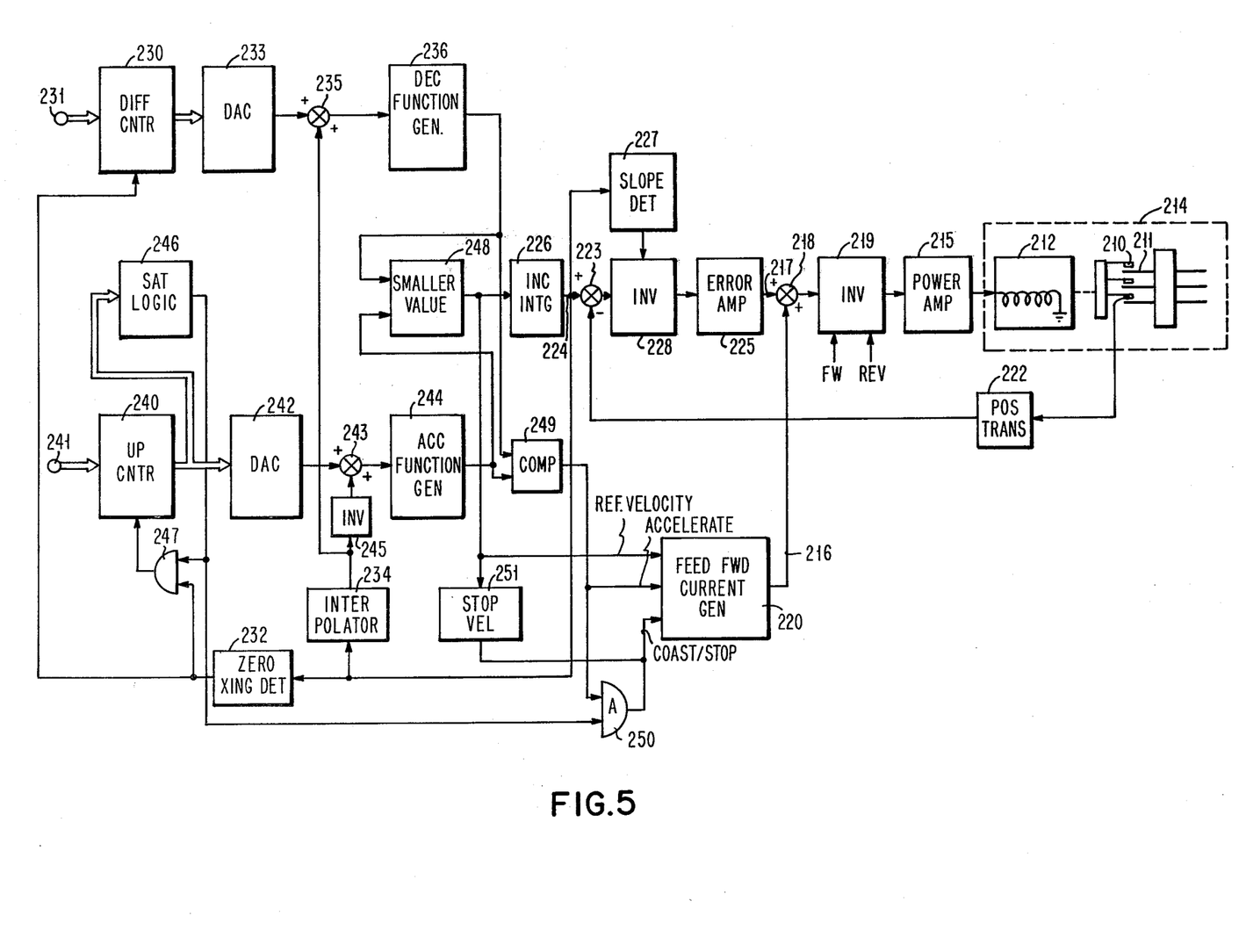
FIG. 5 shows an alternative positioning system according to the present invention.

In FIG. 5 there is shown another embodiment of the present invention which makes use of the reduction in feedback loop bandwidth permitted by the addition of "feedforward" control, to employ a position signal directly as the feedback controlled variable.

The system of FIG. 5, like the system of FIG. 1, is a system for positioning magnetic heads 210 in relation to tracks on disks 211 of a disk file by means of an electromagnetic voice coil actuator 212. The actuator input circuit comprises a power amplifier 215. The control signal to the power amplifier input comprises a primary signal on line 216 and a secondary or feedback signal on line 217 which are summed in junction 218 and selectively inverted by inverter 219 in dependence on the direction of motion. The primary signal is provided by current generator 220 which operates in exactly the same way as the generator 20 of FIG. 1, though the control inputs to the generator are derived somewhat differently as will be described below.

A periodic position signal is derived by position transducing circuitry 222 from servo signals read back by one of the heads 210 from a dedicated servo surface on one of the disks 211. The operation of the circuitry and the form of the triangular position signal is exactly the same as for the circuit of FIG. 1. However, unlike FIG. 1, no velocity transducer circuitry is provided and the periodic position signal is fed back directly to a summing junction 223 for comparison with a reference periodic position on line 224. The difference signal from junction 223 is alternately inverted by inverter 228 in dependence on the slope of the reference periodic position signal as detected by slope detector 227. The alternately inverted difference signal constitutes the position error signal and is amplified by error amplifier 225 to provide the feedback control signal.

The reference periodic position signal is generated by integrating a reference velocity signal repeatedly up and down between predetermined levels in incremental integrator 226, the operation of which will be described below in connection with FIGS. 6 and 7. The reference velocity signal comprises both an accelerate and decelerate portion and feedback control is thus available for the complete duration of the motion. The decelerate portion of the reference velocity signal is provided in very similar fashion to FIG. 1. A difference counter 230 is loaded at terminal 231 with a value representing the number of tracks to be crossed. The difference counter is decremented by output pulses from zero crossing detector 232 during the motion and its output converted to an analog function by DAC 233 and smoothed by fill-in signals from interpolator 234. The absolute position error signal thus derived from summing junction 235 is applied to decelerate function generator 236 to produce a reference velocity signal in the manner of FIG. 1.

The accelerate portion of the reference velocity signal is produced somewhat similarly. An up counter 240 is set to zero as difference counter 230 is loaded with the difference count. A DAC 242, summing junction 243 and accelerate function generator 244 produce a rising curve representing the required velocity for time optimal motion at successive positions. The fill-in signal available from interpolator 234 is inverted in inverter 245 before it is applied to summing junction 243. Saturation logic 246 indicates that the up counter has reached a certain predetermined value upon which further counting is inhibited by means of inhibit gate 247.

The acceleration curve and the deceleration curve are passed through a circuit 248 for passing whichever has the lower value. The output of this circuit is the reference velocity curve which is input to the incremental integrator 226. A comparator circuit 249 provides an output signal indicating which of the acceleration and deceleration curves is of greater magnitude. This indication identifies the acceleration phase of the motion and is applied to the generator 220 as a control input.

A second control input to the generator is a maximum velocity signal, provided by the AND gate 250 from the output of saturation logic 246 and the accelerate signal from comparator 249. A second input to the same line is provided by stop velocity detector 251 which detects when the reference velocity effectively falls to zero, indicating that the seek is complete.

Figure 6:
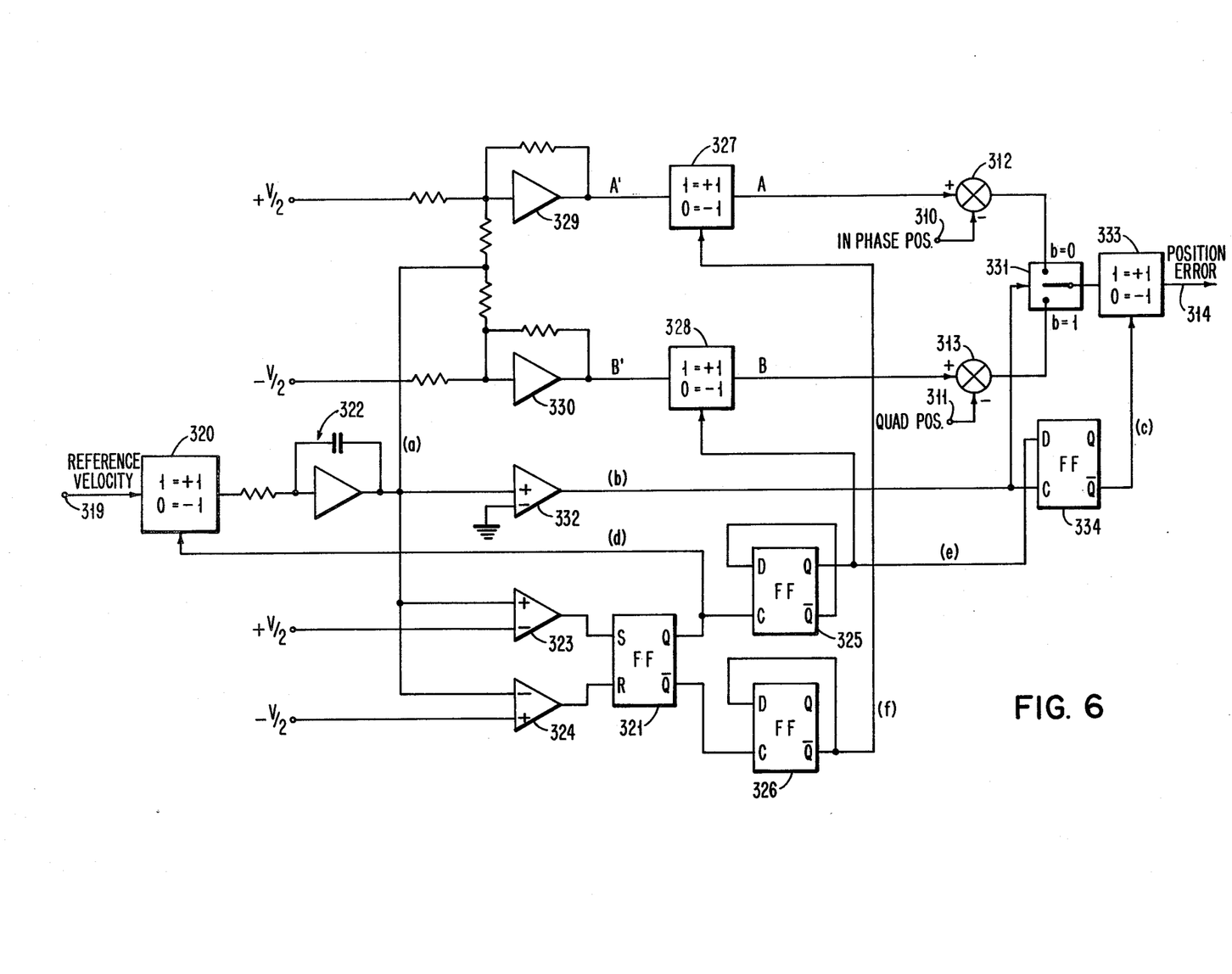
FIG. 6 shows a reference periodic position signal generating circuit suitable for use in the system of FIG. 5.

A preferred form of incremental integrator and associated switching circuitry suitable for use in the general system of FIG. 5 is shown in FIG. 6. Waveforms produced by the circuitry of FIG. 6 are shown in FIG. 7. The circuitry of FIG. 6 is directly applicable to the system of FIG. 5 with the modification that two phases of position signal (both measured and reference) are provided. The two phases are of identical form to the sawtooth signals described in the Oswald article, referenced above, but are phase displaced by 90 degrees. One signal is normally referred to as the "in phase" position signal and the other as the "quadrature" position signal.

Figure 7:
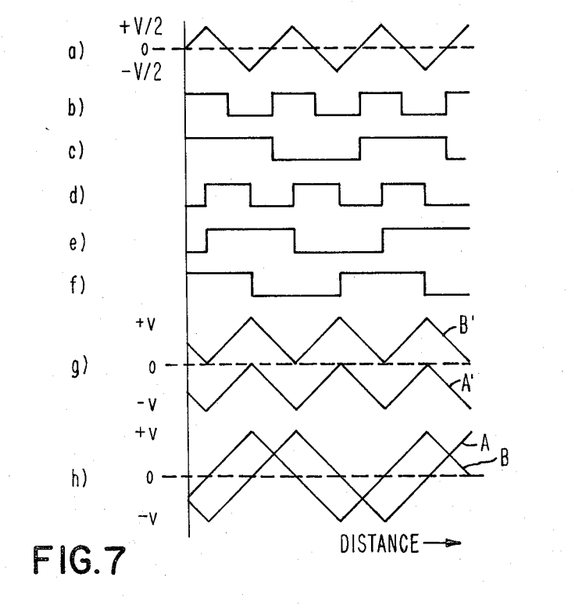
FIG. 7 shows waveforms occurring in the circuit of FIG. 5.

As shown in FIG. 6, the measured in phase and quadrature position signals are applied at terminals 310 and 311 for comparison with reference quadrature position signals A and B, FIG. 7(h) in junctions 312 and 313 respectively. The junctions 312 and 313 correspond to the summing junction 223 of FIG. 5 and their outputs are alternately selected by logic to be described to remove the effect on the position error signal of the slope changes and peaks of the position signals. A single position error output signal is provided at output 314.

The two phases of reference periodic position signal are produced by applying the reference velocity signal from circuit 248 (FIG. 5) to the input 319 of a selective inverter 320. The inverter is controlled by a signal (d), FIG. 7(d), from the normal output of a set/reset flip-flop 321. When signal (d) is up (=1), the reference velocity signal is passed through circuit 320 without inversion. When signal (d) is down (=0), the reference velocity signal is inverted. An integrator 322 integrates the alternately inverted reference signal to produce a signal (a), FIG. 7(a), which is of triangular form and resembles a single phase position signal. The alternation of the flip-flop 321 is controlled by comparators 323 and 324 which compare the magnitude of the integrator output (a) with predetermined reference levels $+V/2$ and $-V/2$. Thus, the integrator output reverses slope every time one of the levels $\pm V/2$ is reached.

The normal and inverted outputs of flip-flop 321 are used to clock respective data/clock flip-flops 325 and 326 which produce output signals (e) and (f) as shown. Signals (e) and (f) are illustrated in FIGS. 7(e) and 7(f). These signals are at half the frequency of signal (d) and are 90 degrees displaced in phase from each other. They are employed to switch selective inverters 327 and 328 in the generation of reference periodic position signals A and B.

The two signals A and B are produced by applying waveform (a) to a level shifting network including amplifiers 329 and 330 to produce two intermediate signals A' and B', FIG. 7(g), which are centered about $+V/2$ and $-V/2$ volts respectively. Application of these intermediate signals A' and B' to selective inverters 327 and 328 produce the reference periodic position signals A and B, FIG. 7(h), which are of twice the amplitude and half the frequency of intermediate signals A' and B'.

The reference position signals A and B from inverters 327 and 328 are next compared with the measured in phase and quadrature position signals in summing junctions 312 and 313. For the output of the summing junctions to represent the position error, the effects of slope change and inversion of the position signals must be removed. To accomplish this, a switch circuit 331 is employed to select either the "in phase" or the quadrature position error in dependence on the value of a waveform (b), shown in FIG. 7(b). The waveform (b) is produced by an overdriven comparator 332 in response to the waveform (a). The switch 331 operates to select alternately only the position error signal derived from central linear portions of the position signals. This signal will invert according to whether the slope of the position signals is positive or negative when the comparison is made. To remove the slope sign dependence a selective inverter 333 is interposed between the output of switch 331 and output terminal 314. The selective inverter is controlled by a waveform (c), shown in FIG. 7(c), derived by data/clock flip-flop 334 from waveform (b).

As was the case with FIG. 1, the system of FIGS. 5, 6 and 7 employs feedback control only as a minor correction imposed on the basic primary control. As discussed in connection with FIG. 1, the use of approximate primary control permits the gain and bandwidth of the minor feedback loop to be significantly lower than where feedback control alone is employed. In the system of FIGS. 5, 6 and 7, this fact permits the use of the position transducer output directly as a feedback controlled variable. In a pure feedback positioning system, a position feedback loop is not used where high performance is required since the bandwidth available with position signal feedback is low compared to that of a velocity feedback loop.

Although the system has been described in terms of substantially continuous position information from a dedicated servo disk surface, it is also suitable for use with positioning systems where position information is only available at relatively infrequent sampling times. In a disk file context, such a system would be of the type where no dedicated servo surface is provided but, instead, servo information is distributed in sectors on the data surfaces of the disks. In such systems, position information is sampled at servo sector times and interpolated in between sectors. The bandwidth available is much lower than with a continuous source of servo position information. The systems of FIGS. 5 and 6 are easily modified to accommodate a sampled source of servo information. For example, the position transducer circuitry 222 could have a provision for sampling the information from heads 10 at sector times only and for holding sampled position signals, or interpolating between them, between sectors. Alternatively, the output of the error amplifier 225 could be sampled and then held or interpolated between sectors. The use of primary or "feedforward" control in conjunction with such a sampled system would allow a relatively high performance to be achieved.

Finally, it will be apparent to one skilled in the art that the disclosed invention may be applied not only to disk file head positioning, but to other positioning systems in general.

What is claimed is:

1. A position control system for moving a member with time optimal motion between a current position and a target position in response to a single input command which defines the distance between said positions, comprising in combination:
   (a) an electromagnetic actuator coupled to said member and having a load acceleration characteristic which is proportional to the input current supplied thereto for accelerating and decelerating said member with said time optimal motion in response to an electric drive signal applied to the input circuit of said actuator;
   (b) means including a power source and a first summing junction connected to said actuator for providing to said actuator said drive signal to cause said member to tend to follow a predetermined acceleration and deceleration profile for said distance to be moved specified by said single input command;
   (c) a first generator for supplying to said first summing junction a first time varying signal corresponding to the profile of the actuator current required to move said member the distance specified by said input command with time optimal motion in an ideal system;
   (d) an error amplifier connected to supply an error signal to said first summing junction concurrently with said first time varying signal and having means for limiting the value of its output to no more than 15% of the value of said current drive signal;

(e) a second order position control system in which position is the controlled variable and acceleration is the manipulated variable for providing to said error amplifier an error signal representing the difference in the instantaneous position of said member in said actual system and said ideal system, said error signal varying the instantaneous acceleration and deceleration of said member in a direction tending to reduce said instantaneous position error, and further including a position transducer connected thereto for providing a signal to said second order position control system corresponding to the instantaneous actual position of said member during said time optimal motion; and (f) means for controlling the operation of said first generator in response to the operation of said second order position control system to cause the respective signals generated thereby to be supplied concurrently to said first summing junction to achieve time optimal movement of said member.

2. The combination recited in claim 1 in which said first time varying signal supplied by said first generator reflects any effect the back EMF generated by the actuator coil during movement has on the profile of said required actuator current.

3. The combination recited in claim 1 in which said electromagnetic actuator includes a movable coil which generates a back EMF during said time optimal movement which is proportional to the instantaneous velocity of the coil and further including means for supplying to said first generator a signal corresponding to the instantaneous actual velocity of said member.

4. The combination recited in claim 3 in which said first generator includes means for generating a signal representing the absolute acceleration-deceleration profile of said member and means for combining said absolute signal with said actual velocity signal to produce said time varying signal.

5. The combination recited in claim 2 in which said electromagnetic actuator includes a movable coil which generates a back EMF during said time optimal movement which is proportional to the instantaneous velocity of the coil and in which said second order position control system includes means for generating a predetermined reference velocity signal in response to said input command, said first generator includes means for generating a signal corresponding to an absolute acceleration-deceleration profile of said member in an ideal system and means for combining said reference velocity signal and said absolute signal to produce said first time varying signal.

6. The system recited in claim 1 in which said second order position control system further comprises a second summing junction having an output connected to said error amplifier, a first input connected to said transducer for receiving said signal corresponding to the instantaneous actual position of said member, and a second input, and means connected to said second input for generating a reference position signal in response to said input command corresponding to the instantaneous position of said member during said time optimal movement in an ideal system.

7. The system recited in claim 6 in which said reference position signal generating means include a difference counter for receiving said input command, means responsive to said reference position signal for decrementing said counter to reflect the distance remaining to said target in said ideal system, and means for converting the contents of said difference counter to said reference position signal.

8. The combination recited in claim 7 in which said converting means comprises first means for generating a first reference velocity signal corresponding to the desired reference velocity profile required when said member is decelerating in said ideal system, and means for integrating said reference velocity signal to provide a corresponding reference position signal.

9. The combination recited in claim 8 in which said actuator includes a coil which generates a back EMF when said member is moved and further including a second means for generating a signal corresponding to the desired reference velocity profile when said member is accelerating in said ideal system, and means connected to said first generator from said first and second means for supplying to said first generator an indication of the velocity of said member to cause said first time varying signal to reflect the effect of the back EMF generated by said coil during time optimal movement.

10. A position control system for moving a member along a predetermined path of travel in response to a single input command representing the distance to be moved between a current and target position, said movement being in a minimum of time consistent with performance constraints of the system, comprising in combination:

(a) an electromagnetic actuator having a load acceleration characteristic which is proportional to the input current supplied thereto for accelerating and decelerating said member along said predetermined path in response to an electric current drive signal applied to the input circuit of said actuator;

(b) means including a power source and a first summing junction connected to the input of said actuator for providing to said actuator said current drive signal to cause said member to tend to follow a predetermined acceleration and deceleration profile for said distance to be moved specified by said input command;

(c) a first generator for supplying to said first summing junction a first time varying signal corresponding to the profile of the current required to move said member the distance specified by said input command in said minimum time in an ideal system;

(d) said first time varying signal comprising at least an acceleration portion and a deceleration portion, the respective amplitudes of which at any instant of time reflect the effect of the back EMF which is generated in the coil of the actuator during movement of said member whereby the profile of said first time varying signal is proportional to said predetermined acceleration-deceleration profile;

(e) an error amplifier having its output connected to said first summing junction;

(f) means for providing an error signal to said error amplifier concurrently with said first time varying signal, comprising (g) means for generating an error signal representing the difference between a reference signal and a feedback signal, said error signal being applied to the input of said actuator to finely control the actual instantaneous position of said member by changing the instantaneous deceleration of said member in a direction to reduce said error, said error signal generating means comprising:

(h) means for generating said reference signal in response to said input command, said reference signal corresponding to the velocity position remaining profile of said member in said ideal system;

(i) a feedback loop including a transducer for generating a signal representing the instantaneous actual position of said member during said movement; and (j) a second summing junction having an output connected to said error amplifier;

(k) one input connected to said feedback loop to receive a signal from said transducer and another input connected to receive the output of said reference signal generator; and (l) means connected from said error signal generator for controlling the operation of said first generator in accordance with the operation of said error signal generator and in response to said input command to achieve time optimal movement of said member over the distance specified by said input command.

11. The combination recited in claim 10, in which said feedback loop further includes means connected between said transducer and said one input of said second summing junction for converting the output signal of said transducer representing instantaneous actual position of said member to a signal representing the instantaneous actual velocity of said member.

12. The combination recited in claim 11 in which said reference signal generating means includes a difference counter, means for supplying said input command to said difference counter, means connected to said difference counter and said position transducer for decrementing said difference counter in accordance with the movement of said member so that the contents of said counter corresponds to the distance remaining to said target track, means for converting the digital count in said counter to a corresponding analog signal, and function generating means connected to the output of said converting means for supplying said reference signal to said another input of said second summing junction.

13. The combination recited in claim 12 further including means connected between the output of said second summing junction and said first generator for determining when the sign of said error signal changes from positive to negative.

* * * * *